United States Patent
Aoshima et al.

(10) Patent No.: US 12,280,357 B2
(45) Date of Patent: Apr. 22, 2025

(54) ADSORBENT PARTICLES, BASE PARTICLE, PACKED COLUMN, AND METHOD FOR RECOVERING RARE-EARTH ELEMENT

(71) Applicant: Resonac Corporation, Tokyo (JP)

(72) Inventors: Masahiro Aoshima, Tokyo (JP); Yohei Ishikawa, Tokyo (JP); Masaru Watanabe, Tokyo (JP)

(*) Notice: Subject to any disclaimer, the term of this patent is extended or adjusted under 35 U.S.C. 154(b) by 663 days.

(21) Appl. No.: 17/617,938

(22) PCT Filed: Jun. 12, 2020

(86) PCT No.: PCT/JP2020/023134
§ 371 (c)(1),
(2) Date: Dec. 10, 2021

(87) PCT Pub. No.: WO2020/251000
PCT Pub. Date: Dec. 17, 2020

(65) Prior Publication Data
US 2022/0305457 A1    Sep. 29, 2022

(30) Foreign Application Priority Data

Jun. 13, 2019   (JP) .................. 2019-110463

(51) Int. Cl.
| | | |
|---|---|---|
| B01J 20/26 | (2006.01) | |
| B01J 20/28 | (2006.01) | |
| B01J 20/32 | (2006.01) | |
| B01J 20/34 | (2006.01) | |
| C22B 3/24 | (2006.01) | |
| C22B 59/00 | (2006.01) | |

(52) U.S. Cl.
CPC ....... B01J 20/261 (2013.01); B01J 20/28057 (2013.01); B01J 20/3272 (2013.01);
(Continued)

(58) Field of Classification Search
CPC ........ B01D 15/00; B01D 15/08; B01D 15/10; B01J 20/22; B01J 20/26; B01J 20/261;
(Continued)

(56) References Cited

U.S. PATENT DOCUMENTS 4,115,261 A * 9/1978 Corte ...................... C08J 9/286
210/916

FOREIGN PATENT DOCUMENTS

| CN | 105073245 | 11/2015 |
|---|---|---|
| CN | 107002175 | 8/2017 |

(Continued)

OTHER PUBLICATIONS

Shinozaki, Tomohiro, et al., "Preparation of Polymeric Adsorbents Bearing Diglycolamic Acid Ligands for Rare Earth Elements", Industrial & Engineering Chemistry Research, 2018, p. 11424-p. 11430, vol. 57.

(Continued)

*Primary Examiner* — Brian A McCaig
(74) *Attorney, Agent, or Firm* — SOEI PATENT & LAW FIRM

(57) ABSTRACT

Adsorbent particles each containing: a carrier particle containing an organic polymer containing a monomer unit derived from a styrene-based monomer; a hydrophilic organic compound adhered to a surface of the carrier particle; and a diglycolic acid residue bonded to the hydrophilic organic compound. When a BET specific surface of the adsorbent particles as determined by adsorption of nitrogen gas is $X_0$ and a BET specific surface area of the adsorbent particles as determined by adsorption of water vapor is $X_1$, $X_1/X_0$ is 0.10 to 1.0.

12 Claims, 2 Drawing Sheets

(52) U.S. Cl.
CPC ......... *B01J 20/328* (2013.01); *B01J 20/3475* (2013.01); *C22B 3/24* (2013.01); *C22B 59/00* (2013.01)

(58) Field of Classification Search
CPC .............. B01J 20/28; B01J 20/28016; B01J 20/28057; B01J 20/3272; B01J 20/328; B01J 20/34; B01J 20/3458; B01J 20/3475; B01J 2220/4812; C22B 3/24; C22B 59/00; Y02P 10/20
See application file for complete search history.

(56) References Cited

FOREIGN PATENT DOCUMENTS

| | | |
|---|---|---|
| JP | S61-257236 | 11/1986 |
| JP | 2017-035671 | 2/2017 |
| JP | 6103611 | 3/2017 |
| JP | 2017-125796 | 7/2017 |
| JP | 2019-025472 | 2/2019 |
| JP | 2020-196925 | 12/2020 |
| WO | 2015/137451 | 9/2015 |
| WO | 2016/047700 | 3/2016 |
| WO | 2019/078368 | 4/2019 |

OTHER PUBLICATIONS

Takeshi Ogata, et al., "Adsorption behavior of rare earth elements on silica gel modified with diglycol amic acid", Hydrometallurgy, 2015 (152), p. 178-p. 182.
International Search Report dated Aug. 25, 2020 for PCT/JP2020/023134.
International Preliminary Report on Patentability with Written Opinion dated Dec. 23, 2021 for PCT/JP2020/023134.

* cited by examiner

ADSORBENT PARTICLES, BASE PARTICLE, PACKED COLUMN, AND METHOD FOR RECOVERING RARE-EARTH ELEMENT

CROSS-REFERENCE TO RELATED APPLICATIONS

This application is a 35 U.S.C. § 371 national phase application of PCT/JP2020/023134, filed on Jun. 12, 2020, which claims priority to Japanese Patent Application No. 2019-110463, filed on Jun. 13, 2019.

TECHNICAL FIELD

The present invention relates to adsorbent particles, base material particles, a packed column, and a method for recovering a rare earth element.

BACKGROUND ART

As an adsorbent that selectively adsorbs and desorbs a rare earth element, materials obtained by introducing diglycolic acid onto the surface of various particles have been proposed (Patent Literature 1, Non Patent Literatures 1 and 2).

CITATION LIST

Patent Literature

Patent Literature 1: Japanese Patent No. 6103611

Non Patent Literature

Non Patent Literature 1: Takeshi Ogata, Hydrometallurgy, 152 (2015) 178-182
Non Patent Literature 2: Tomohiro Shinozaki, Ind. Eng. Chem. Res., 57 (2018) 11424-11430

SUMMARY OF INVENTION

Technical Problem

According to an aspect of the present invention, there are provided adsorbent particles which have a large adsorption amount of a rare earth element and from which an adsorbed rare earth element can be desorbed at a high proportion.

Solution to Problem

An aspect of the present invention relates to adsorbent particles each comprising: a carrier particle containing an organic polymer; a hydrophilic organic compound adhered to a surface of the carrier particle; and a diglycolic acid residue bonded to the hydrophilic organic compound. When a BET specific surface area of the adsorbent particles as determined by adsorption of nitrogen gas is $X_0$ and a BET specific surface area of the adsorbent particles as determined by adsorption of water vapor is $X_1$, $X_1/X_0$ is 0.10 to 1.0.

Another aspect of the present invention relates to base material particles each comprising: a carrier particle containing an organic polymer; and a hydrophilic organic compound adhered to a surface of the carrier particle. When a BET specific surface area of the base material particles as determined by adsorption of nitrogen gas is $Y_0$, and a BET specific surface area of the base material particles as determined by adsorption of water vapor is $Y_1$, $Y_1/Y_0$ is 0.05 to 1.00.

Still another aspect of the present invention relates to a packed column comprising: a column main body part; and the above-described adsorbent particles packed in the column main body part.

Still another aspect of the present invention relates to a method for recovering a rare earth element, the method including: bringing a solution containing a rare earth element into contact with the above-described adsorbent particles and thereby causing the rare earth element to be adsorbed to the adsorbent particles; and causing the rare earth element to be desorbed from the adsorbent particles by contact with an acidic solution containing an acid.

Advantageous Effects of Invention

According to an aspect of the present invention, there are provided adsorbent particles which have a large adsorption amount of a rare earth element and from which the adsorbed rare earth element can be desorbed at a high proportion.

DESCRIPTION OF EMBODIMENTS

Figure 1:
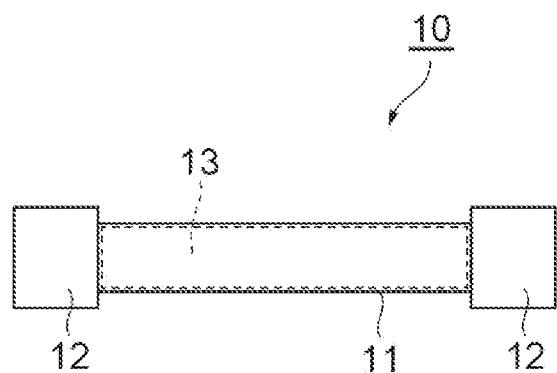
FIG. 1 is a schematic diagram illustrating an embodiment of a packed column.

Hereinafter, several embodiments of the present invention will be described in detail. However, the present invention is not limited to the following embodiments.

Adsorbent particles according to an embodiment each contains a carrier particle containing an organic polymer; a hydrophilic organic compound adhered to the surface of the carrier particle; and a diglycolic acid residue bonded to the hydrophilic organic compound.

The carrier particle is a polymer particle containing an organic polymer as a main component. The organic polymer may be crosslinked. The proportion of the organic polymer in the carrier particle may be 50% to 100% by mass, 60% to 100% by mass, 70% to 100% by mass, 80% to 100% by mass, or 90% to 100% by mass.

The organic polymer, which forms the carrier particles according to an embodiment, is a polymer containing a monomer unit derived from a styrene-based monomer (hereinafter, may be referred to as "styrene-based polymer"). The styrene-based monomer is styrene or a styrene derivative and may be a crosslinkable monomer, which will be described below, a monofunctional monomer, or a combination of these. The proportion of the styrene-based monomer in the styrene-based polymer may be 20 mol % to 85 mol %, or 35 mol % to 70 mol %, with respect to the total amount of the monomer units constituting the styrene-based polymer.

The organic polymer may be a polymer containing a crosslinkable monomer as a monomer unit. The crosslinkable monomer may be, for example, a divinyl compound such as divinylbenzene, divinylbiphenyl, divinylnaphthalene, or divinylphenanthrene. These crosslinkable monomers may be used singly, or two or more kinds thereof may be used in combination. From the viewpoints of durability, acid resistance, and alkali resistance, the crosslinkable monomer may be divinylbenzene, which is a styrene-based monomer. The proportion of the monomer unit derived from a crosslinkable monomer in the organic polymer may be 1 mol % to 80 mol %, 1 mol % to 60 mol %, or 1 mol % to 40 mol %, with respect to the total amount of the monomer units constituting the organic polymer.

The organic polymer may be a copolymer of a crosslinkable monomer and a monofunctional monomer. Examples of the monofunctional monomer include styrene-based monomers such as styrene, o-methylstyrene, m-methylstyrene, p-methylstyrene, α-methylstyrene, o-ethylstyrene, m-ethylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These may be used singly, or two or more kinds thereof may be used in combination. From the viewpoints of acid resistance and alkali resistance, the monofunctional monomer may be styrene.

The organic polymer may contain a monomer having a reactive group that reacts with the hydrophilic organic compound, as a monomer unit. The organic polymer may be a copolymer containing a crosslinkable monomer and a monomer having a reactive group, as monomer units. The reactive group may be, for example, an epoxy group, a chloro group, or a combination of these. Examples of the monomer having the epoxy group include glycidyl methacrylate. Examples of the monomer having the chloro group include 4-chloromethylstyrene. The proportion of the monomer unit derived from the monomer having the reactive group in the organic polymer may be 15 mol % to 80 mol %, or 30 mol % to 65 mol %, with respect to the total amount of the monomer units constituting the organic polymer.

The average particle size of the carrier particles may be 100 to 1000 μm, or 200 to 1000 μm. When the average particle size of the carrier particles is smaller, there is a possibility that the pressure of the packed column in which the adsorbent particles are packed may increase. Here, the average particle size of the carrier particles can be determined by the following measurement method.

1) Particles are dispersed in water (containing a dispersant such as a surfactant), and a dispersion liquid containing 1% by mass of the particles is prepared.

2) The average particle size is measured using a flow type particle image analyzer, by means of an image of about 10000 particles in the dispersion liquid.

The carrier particles may be porous polymer particles. In the case of porous polymer particles, the surface inside the pores is also included in the "surface of the carrier particles". In a case where the carrier particles are porous polymer particles, the specific surface area may be 50 m$^2$/g or more, and may be 1000 m$^2$/g or less. When the specific surface area is large, the adsorption amount of the material tends to be larger. The specific surface area as used herein means a BET specific surface area based on the adsorption of nitrogen gas.

The hydrophilic organic compound is an organic compound having a hydrophilic group such as an amino group and may be, for example, an amino group-containing polymer containing a constituent unit having an amino group. The amino group-containing polymer may be a homopolymer of a monomer having an amino group. The constituent unit having an amino group may be a group formed of an amino group and an aliphatic group, or a residue of an aliphatic amino acid. Examples of the amino group-containing polymer include polyethyleneimine and polylysine. Polyethyleneimine may be branched or linear and may contain three or more constituent units derived from aziridine.

The molecular weight of the amino group-containing polymer may be 200 or more, or 250 or more. The molecular weight of the amino group-containing polymer may be 100000 or less, 70000 or less, 10000 or less, or 7000 or less. The molecular weight of the amino group-containing polymer may be 200 or more and 100000 or less, 70000 or less, 10000 or less, or 7000 or less, and may be 250 or more and 100000 or less, 70000 or less, 10000 or less, or 7000 or less.

At least a portion of the hydrophilic organic compound (or amino group-containing polymer) adhered to the surface of a carrier particle may be bonded by covalent bonding to the organic polymer. For example, when the organic polymer has a reactive group, the hydrophilic organic compound can be bonded to the organic polymer by covalent bonding as a result of a reaction between the reactive group and a hydrophilic group.

The ratio of the amount of the hydrophilic organic compound (or amino group-containing polymer) with respect to the mass of the carrier particles may be, for example, 5% to 50% by weight or 10% to 40% by weight. When the hydrophilic organic compound is an amino group-containing polymer, the amount of the amino group in the adsorbent particles may be 0.1 to 100 mmol, 0.5 to 100 mmol, 0.1 to 20 mmol, or 0.5 to 20 mmol, per 1 g of the adsorbent particles.

The quantity of the amino group in the adsorbent particles or the base material particles that will be described below can be determined by a method of measuring the amount of sulfuric acid consumed by the reaction with amino groups by titration using sodium hydroxide. The method of measuring the quantity of the amino group in the base material particles includes the following operations.

1) A dispersion liquid obtained by adding methanol to (A) g of base material particles is heated for 30 minutes at 75° C.

2) The base material particles are recovered from the dispersion liquid by suction filtration on a filter. While suctioning is continued, pure water is added to the base material particles on the filter to replace methanol with pure water, and then the base material particles are conditioned using a small amount of a 0.1 M aqueous solution of sodium hydroxide. Subsequently, the base material particles are washed with pure water until the filtrate becomes neutral.

3) The base material particles after washing are transferred into a glass container using a small amount of pure water. The total amount of pure water in the container is adjusted to be (B) g.

4) (C) g of 0.05 M sulfuric acid is added to the dispersion liquid in the container, and then the dispersion liquid in the container is stirred at room temperature for 30 minutes at 150 rpm.

5) (D) g of the supernatant of the dispersion liquid is isolated, and pure water is added thereto to adjust the liquid amount.

6) The supernatant after dilution is titrated using a 0.01 M aqueous solution of sodium hydroxide, and the amount, (E) mL, of the aqueous solution of sodium hydroxide required for neutralization is recorded.

7) The quantity of amino groups is calculated by the following formula.

Quantity of amino groups(mmol/g)=[{0.1×$C$×$D$/($B$+$C$)−0.01×$E$}×($B$+$C$)/$D$]/$A$ A diglycolic acid residue may be, for example, a monovalent group bonded to the amino group of the amino group-containing polymer as shown in the following Formula (1) or (2). The amino group in the formula is the amino group of the amino group-containing polymer, and the moiety excluding the amino group is diglycolic acid residue. As the diglycolic acid residue interacts with a rare earth complex, the adsorbent particles can adsorb a rare earth element.

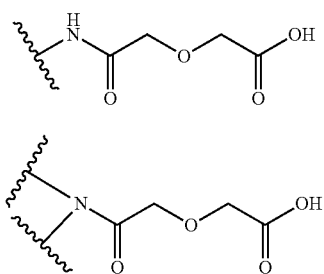

When the adsorbent particles have high hydrophilicity, the adsorption amount and the desorption amount for a rare earth element tend to be increased. One of the reasons is considered that adsorbent particles having high hydrophilicity are easily wetted by an aqueous solution containing the rare earth element, and as a result, the opportunity for the rare earth element to come into contact with the adsorbent particles increases.

The hydrophilicity of the adsorbent particles can be evaluated, in a case where the BET specific surface area of the adsorbent particles as determined by adsorption of nitrogen gas is $X_0$ and the BET specific surface area of the adsorbent particles as determined by adsorption of water vapor is $X_1$, based on the ratio of the two, $X_1/X_0$. A larger value of $X_1/X_0$ means that the hydrophilicity of the adsorbent particles is higher. From the viewpoint of improving the adsorption amount and the desorption amount of the rare earth element, $X_1/X_0$ of the adsorbent particles according to an embodiment is 0.10 to 1.0. $X_1/X_0$ may be 0.11 or more, or 0.26 or more, and may be 0.9 or less, 0.8 or less, 0.7 or less, 0.6 or less, or 0.5 or less. $X_1/X_0$ may be 0.10 or more and 0.9 or less, 0.8 or less, 0.7 or less, 0.6 or less, or 0.5 or less; may be 0.11 or more and 0.9 or less, 0.8 or less, 0.7 or less, 0.6 or less, or 0.5 or less; or may be 0.26 or more and 0.9 or less, 0.8 or less, 0.7 or less, 0.6 or less, or 0.5 or less. By adhering an appropriately selected hydrophilic organic compound (for example, an amino group-containing polymer) to the surface of the carrier particles, adsorbent particles exhibiting the $X_1/X_0$ in the above-described range can be easily obtained.

Similarly to the ratio of the BET specific surface areas, $X_1/X_0$, reflecting the hydrophilicity of the adsorbent particles, improvement of the adsorption amount and the desorption amount of the rare earth element can also be promoted on the basis of the ratio of the BET specific surface areas exhibiting hydrophilicity of the base material particles before the diglycolic acid residue is introduced. Therefore, when the BET specific surface area of the base material particles as determined by adsorption of nitrogen gas is $Y_0$, and the BET specific surface area of the base material particles as determined by adsorption of water vapor is $Y_1$, the ratio of the two, $Y_1/Y_0$, may be 0.05 or more, 0.06 or more, or 0.26 or more, and may be 1.0 or less, 0.4 or less, 0.3 or less, 0.2 or less, or 0.1 or less. $Y_1/Y_0$ may be 0.05 or more and 1.0 or less, 0.4 or less, 0.3 or less, 0.2 or less, or 0.1 or less; may be 0.06 or more and 1.0 or less, 0.4 or less, 0.3 or less, 0.2 or less, or 0.1 or less; or may be 0.26 or more and 1.0 or less, 0.4 or less, 0.3 or less, 0.2 or less, or 0.1 or less.

The adsorbent particles can be produced by, for example, a method including preparing carrier particles and base material particles that contain a hydrophilic organic compound adhered to the surface of the carrier particles but do not have a diglycolic acid residue; and causing diglycolic acid or an anhydride thereof to bond to the hydrophilic organic compound and thereby forming adsorbent particles. When the hydrophilic organic compound is an amino group-containing polymer, diglycolic acid or an acid anhydride thereof can be bonded to the amino group of the amino group-containing polymer.

The base material particles are produced by causing the hydrophilic organic compound to adhere to the surface of the carrier particles. An example of the method of preparing base material particles in a case where the carrier particles contain an organic polymer having a reactive group, includes producing carrier particles, which are porous particles, by suspension polymerization in a reaction liquid containing a monomer component containing a monomer having a reactive group, a porosifier, and an aqueous medium; and causing the hydrophilic organic compound to bond to the organic polymer by a reaction between the reactive group and the hydrophilic organic compound.

The porosifier used for forming porous particles is a component that promotes phase separation of particles during polymerization and thereby forms porous polymer particles. An example of the porosifier is an organic solvent. Examples of the organic solvent that can be used as a porosifier include aliphatic or aromatic hydrocarbons, esters, ketones, ethers, and alcohols. The porosifier can contain at least one selected from the group consisting of, for example, toluene, xylene, cyclohexane, octane, butyl acetate, dibutyl phthalate, methyl ethyl ketone, dibutyl ether, 1-hexanol, 2-octanol, decanol, lauryl alcohol, and cyclohexanol.

The amount of the porosifier may be 0% to 300% by mass with respect to the total amount of the monomer component. The porosity of the porous polymer particles can be controlled by means of the amount of the porosifier. The size and shape of the pores of the porous polymer particles can be controlled by means of the type of the porosifier.

The aqueous medium may contain water. This water may be used to function as a porosifier. For example, when an oil-soluble surfactant is added to the reaction liquid, particles containing monomers and the oil-soluble surfactant are formed, and when these particles absorb water, it is possible to promote phase separation in the particles. By removing any one phase from the particles in which phase separation has occurred, the particles are porosified.

The aqueous medium includes water or a mixed solvent of water and a water-soluble solvent (for example, a lower alcohol). The aqueous medium may contain a surfactant. The surfactant may be an anionic, cationic, nonionic, or amphoteric surfactant.

The reaction liquid for suspension polymerization may contain a polymerization initiator. Examples of the polymerization initiator include organic peroxides such as benzoyl peroxide, lauroyl peroxide, benzoyl ortho-chloroperoxide, benzoyl ortho-methoxyperoxide, 3,5,5-trimethylhexanoyl peroxide, tert-butyl peroxy-2-ethylhexanoate, and di-tert-butyl peroxide; and azo-based compounds such as 2,2'-azobisisobutyronitrile, 1,1'-azobiscyclohexanecarbonitrile, and 2,2'-azobis(2,4-dimethylvaleronitrile). The amount of the polymerization initiator may be 0.1 to 7.0 parts by mass with respect to 100 parts by mass of the monomer component.

In order to enhance dispersion stability of the particles containing the monomer component, the reaction liquid may contain a dispersion stabilizer. Examples of the dispersion stabilizer include polyvinyl alcohol, a polycarboxylic acid, celluloses (hydroxyethyl cellulose, carboxymethyl cellulose, methyl cellulose, and the like), and polyvinylpyrrolidone. These may be used in combination with inorganic water-soluble polymer compounds such as sodium tripolyphosphate. The dispersion stabilizer may be polyvinyl alcohol or polyvinylpyrrolidone. The amount of the dispersion stabilizer may be 1 to 10 parts by mass with respect to 100 parts by mass of the monomers.

The reaction liquid for suspension polymerization may contain a water-soluble polymerization inhibitor such as a nitrite, a sulfite, a hydroquinone, an ascorbic acid, a water-soluble vitamin B compound, citric acid, and a polyphenol compound.

The polymerization temperature for suspension polymerization can be appropriately selected according to the types of the monomer and the polymerization initiator. The polymerization temperature may be 25° C. to 110° C., or 50° to 100° C.

When the hydrophilic organic compound is an amino group-containing polymer, the produced porous particles (carrier particles) are washed and dried as necessary, and then the amino groups of the amino group-containing polymer are reacted with the reactive groups of the organic polymer. This reaction can be carried out, for example, in a reaction liquid containing the carrier particles, the amino group-containing polymer, and a solvent, while heating as necessary. The solvent is not particularly limited; however, the solvent may be, for example, water.

The base material particles are washed and dried as necessary, and then diglycolic acid or an anhydride thereof is bonded to an amino group of the amino group-containing polymer adhered to the carrier particles. This reaction can be carried out, for example, in a reaction liquid containing the base material particles, diglycolic acid or an anhydride thereof, and a solvent, while heating as necessary. The solvent is not particularly limited; however, the solvent may be, for example, tetrahydrofuran. As a result of this reaction, adsorbent particles into which diglycolic acid residues have been introduced are formed. The formed adsorbent particles are washed and dried as necessary.

The base material particles containing the carrier particles and the hydrophilic organic compound adhered to the surface of the carrier particles may be used in order to obtain adsorbent particles or separatory material particles, into which a ligand other than a diglycolic acid residue has been introduced. The average particle size of the base material particles is usually substantially the same as the average particle size of the adsorbent particles.

A rare earth element can be efficiently recovered by a method including: bringing the adsorbent particles into contact with a solution containing the rare earth element to thereby cause the rare earth element to be adsorbed to the adsorbent particles; and causing the rare earth element to be desorbed from the adsorbent particles in an acidic solution containing an acid.

The temperatures of the solution for adsorption and the acidic solution for desorption are not particularly limited; however, the temperatures may be, for example, 15° C. to 35° C. The time for contact between the solution for adsorption and the adsorbent particles may be, for example, 20 seconds or more or 40 seconds or more, and may be 48 hours or less. The time for contact between the acidic solution for desorption and the adsorbent particles may be, for example, 5 seconds or more or 10 seconds or more, and may be 6 hours or less.

The recovery method of using the adsorbent particles according to the present embodiment enables efficient recovery of a rare earth element based on the large adsorption amount due to the adsorbent particles and efficient desorption of the adsorbed rare earth element. Furthermore, since the adsorbent particles according to the present embodiment have high resistance to acid as compared to adsorbent particles containing silica particles as the carrier particles, it is advantageous from the viewpoint that when used repeatedly, deterioration occurs to a reduced level.

The pH of the solution when a rare earth element is caused to adsorb to the adsorbent particles may be about 1.0 to 2.0. The acidity of the acid solution for causing the degree of acidity rare earth element to be desorbed is adjusted to the intensity of the extent that the rare earth element is appropriately desorbed. For example, the acid concentration of the acidic solution may be 2 N or less, 1 N or less, or 0.5 N or less. In the adsorbent particles according to the present embodiment, the rare earth element can be desorbed highly efficiently even in a case where an acidic solution of relatively weak acidity is used. Using an acidic solution of weak acidity is beneficial not only from the viewpoint of suppressing deterioration of the adsorbent but also from the viewpoint of reducing the environmental load. The acidic solution may be, for example, hydrochloric acid.

The rare earth element to be recovered may be any of scandium, yttrium, and a lanthanoid and may be a lanthanoid such as dysprosium or neodymium. The solution containing the rare earth element to be recovered may be an aqueous solution. The rare earth element in the solution is usually dissolved as a cation in the solvent (for example, water).

The adsorbent particles may also be used as a column packing material. FIG. 1 is a schematic diagram illustrating an embodiment of a packed column. A packed column 10 shown in FIG. 1 has a column main body part 11 (column tube); connection parts 12; and a column packing material 13 containing the adsorbent particles according to the above-described embodiment. The connection parts 12 are disposed at the two ends of the column main body part 11 in order to connect the column main body part 11 to a column chromatography apparatus. The column packing material 13 is packed in the tubular-shaped column main body part 11. The materials of the column main body part 11 and the connection parts 12 are not particularly limited and may be stainless steel or may be a resin such as polyether ether ketone (PEEK).

The column packing material 13 containing the adsorbent particles is usually packed in the column main body part 11 together with a solvent. The solvent is not particularly limited as long as it is a solvent in which the adsorbent particles are dispersed; however, the solvent may be, for example, water.

In the case of recovering a rare earth element using a packed column, for example, a solution containing the rare earth element is passed through the packed column, and subsequently an acidic solution is passed through the packed column.

EXAMPLES

Hereinafter, the present invention will be more specifically described by way of Examples. However, the present invention is not intended to be limited to these Examples.

1. Production of Adsorbent Particles

Example 1

Base Material Particles

Porous polymer particles (specific surface area: 330 m$^2$/g) formed from a divinylbenzene-glycidyl methacrylate copolymer, which is a styrene-based polymer, were prepared as carrier particles. These porous polymer particles were added to methanol, and the suspension was shaken and stirred to wet the porous polymer particles with methanol. Subsequently, the suspension was filtered while the suspension was maintained in a wet state using pure water, to replace methanol with pure water. Polyethyleneimine (molecular weight 300, amine value 21 mmol/g) was added to the suspension containing pure water and the wetted porous polymer particles such that the amount of polyethyleneimine would make the ratio of water:polyethyleneimine 1:2 as a mass ratio, and then a reaction between epoxy groups of the porous polymer particles and polyethyleneimine was carried out by heating the suspension at 80° C. for 8 hours. The porous polymer particles taken out by filtration were sufficiently washed with ethanol and water and then dried for 15 hours at 80° C. to obtain base material particles having polyethyleneimine introduced therein. The average particle size of the obtained base material particles was 400 μm, and the quantity of amino groups per 1 g of the base material particles was 2.5 mmol.

Adsorbent Particles 1.2 g of the base material particles and 5.6 g of diglycolic anhydride were reacted with each other in tetrahydrofuran at 50° C. for 8 hours. The particles taken out by filtration were sufficiently washed with ethanol and water and then dried at 80° C. for 15 hours to obtain adsorbent particles having diglycolic acid residues introduced therein.

Example 2

Adsorbent particles having diglycolic acid residues introduced therein were obtained by an operation similar to that of Example 1, except that a polyethyleneimine having a molecular weight of 1200 and an amine value of 19 mmol/g was used. The average particle size of the base material particles was 400 μm, and the quantity of amino groups per 1 g of the base material particles was 3.5 mmol.

Example 3

Porous polymer particles formed from the same divinylbenzene-glycidyl methacrylate copolymer as that used in Example 1 were prepared as carrier particles. These porous polymer particles were added to methanol, and the suspension was shaken and stirred to wet the porous polymer particles with methanol. Subsequently, the suspension was filtered while the suspension was maintained a wet state using pure water, to replace methanol with pure water. Subsequently, the solvent of the suspension was replaced from pure water to an aqueous solution of polylysine (concentration 0% by mass, molecular weight: about 5000). A reaction between epoxy groups of the porous polymer particles and polylysine was carried out by heating at 80° C. for 8 hours. The porous polymer particles taken out by filtration were sufficiently washed with ethanol and water and then dried at 80° C. for 15 hours, to obtain base material particles having polylysine introduced therein. The average particle size of the base material particles was 400 μm, and the quantity of amino groups per 1 g of the base material particles was 3.4 mmol.

Adsorbent particles having diglycolic acid residues introduced therein were obtained by an operation similar to that of Example 1, except that the obtained base material particles were used.

Comparative Example 1

Porous polymer particles formed from the same divinylbenzene-glycidyl methacrylate copolymer as that used in Example 1 were prepared as carrier particles. These porous polymer particles were added to methanol, and the suspension was shaken and stirred to wet the porous polymer particles with methanol. Subsequently, the suspension was filtered while the suspension was maintained a wet state using pure water, to replace methanol with pure water. Subsequently, the solvent of the suspension was replaced from pure water to ethylenediamine by a similar method. A reaction between epoxy groups of the porous polymer particles and ethylenediamine was carried out by heating the suspension at 80° C. for 8 hours. The porous polymer particles taken out by filtration were sufficiently washed with ethanol and water and then dried at 80° C. for 15 hours, to obtain base material particles having ethylenediamine introduced therein. The average particle size of the base material particles was 400 μm, and the quantity of amino groups per 1 g of the base material particles was 2.4 mmol.

Adsorbent particles having diglycolic acid residues introduced therein were obtained by an operation similar to that of Example 1, except that the obtained base material particles were used.

Comparative Example 2

Adsorbent particles having diglycolic acid residues introduced therein were obtained by an operation similar to that of Comparative Example 1, except that diethylenetriamine was used instead of ethylenediamine. The average particle size of the base material particles was 400 μm, and the quantity of amino groups per 1 g of the base material particles was 2.6 mmol.

Comparative Example 3

Polymer particles formed from a methacrylate copolymer, which is an acrylic polymer, the methacrylate copolymer having epoxy groups introduced therein, were prepared as carrier particles. The quantity of epoxy groups per 1 g of these polymer particles was 0.6 to 1.0 mmol. Ethylenediamine was added to these polymer particles, and subsequently the mixture was heated at 80° C. for 8 hours to carry out a reaction between epoxy groups of the polymer particles and ethylenediamine. The polymer particles taken out by filtration were sufficiently washed with ethanol and water and then dried at 80° C. for 15 hours, and thereby base material particles having ethylenediamine introduced therein were obtained. The quantity of amino groups per 1 g of the base material particles was 1.2 mmol.

Adsorbent particles having diglycolic acid residues introduced therein were obtained by an operation similar to that of Example 1, except that the obtained base material particles were used.

2. Evaluation

2-1. Evaluation of Hydrophilicity

Moisture was removed from each sample of the adsorbent particles by a pretreatment. Next, an adsorption isotherm of the sample was obtained at a relative pressure in the range of 0.1 or less, by measurement of the adsorption amount of nitrogen gas or water vapor using a BET gas adsorption apparatus (3 Flex, manufactured by Micromeritics Instrument Corporation). The measurement temperature was set to the liquid nitrogen temperature (−196° C.) in the case of nitrogen gas adsorption, and to 25° C. in the case of water vapor. From the obtained adsorption isotherm, the BET specific surface area $X_0$ of the adsorbent particles as determined by adsorption of nitrogen gas and the BET specific surface area $X_1$ of the adsorbent particles as determined by adsorption of water vapor were determined. Next, the ratio of the two, $X_1/X_0$, was calculated.

By a similar method, hydrophilicity of the base material particles produced in Example 3, which was obtained before diglycolic acid residues were introduced, was also evaluated. The BET specific surface area $Y_0$ of the base material particles as determined by adsorption of nitrogen gas was 144 m²/g, the BET specific surface area $Y_1$ of the base material particles as determined by adsorption of water vapor was 13.4 m²/g, and the ratio of the two, $Y_1/Y_0$, was 0.093.

2-2. Adsorption Test 5 mL of an aqueous solution for adsorption test that contained dysprosium (Dy) at a concentration of 160 ppm and had the pH adjusted to 1.3, was prepared. 50 mg of each kind of the adsorbent particles were added to this aqueous solution. The suspension containing the adsorbent particles was shaken while being maintained at 25° C. Dysprosium ions were adsorbed to the adsorbent particles by shaking for 24 hours, and then for an aqueous solution collected from the suspension, the dysprosium ion concentration in the aqueous solution was measured using an ICP emission spectrometer. From the difference between the ion concentrations obtained before and after the adsorption, the adsorption amount (μmol/g) of dysprosium ions per 1 g of the adsorbent particles was calculated.

2-3. Desorption Test

Hydrochloric acid was added to the suspension containing the adsorbent particles after completion of the adsorption test to adjust the pH thereof to −0.3, which was equivalent to a hydrochloric acid concentration of 2 N. The suspension with pH=−0.3 was shaken for 3 hours while being maintained at a temperature of 25° C. to desorb dysprosium ions from the adsorbent particles. For an aqueous solution collected from the suspension, the dysprosium ion concentration in the aqueous solution was measured using an ICP emission spectrometer. From the difference between the ion concentrations obtained before and after desorption, the amount of desorbed dysprosium ions (desorption amount, μmol/g) per 1 g of the adsorbent particles was calculated.

The amount of desorbed dysprosium ions (desorption amount, μmol/g) per 1 g of the adsorbent particles was determined by the same method as described above, except that the pH of the suspension for desorption was changed to 0.3, which was equivalent to a hydrochloric acid concentration of 0.5 N.

TABLE 1

| | Carrier particles | BET specific surface area (m²/g) $X_0$ (nitrogen gas) | BET specific surface area (m²/g) $X_1$ (water vapor) | Hydrophilicity $X_1/X_0$ | pH | Adsorption test Dy adsorption amount (μmol/g) | Desorption test Dy desorption amount (μmol/g) |
|---|---|---|---|---|---|---|---|
| Ex. 1 | Styrene-based polymer | 122 | 14.8 | 0.121 | 1.3 | 48 | 46 |
| Ex. 2 | Styrene-based polymer | 50.5 | 16.4 | 0.325 | 1.3 | 80 | 71 |
| Ex. 3 | Styrene-based polymer | 94 | 18.2 | 0.194 | 1.3 | 44 | 41 |
| Comp. Ex. 1 | Styrene-based polymer | 203 | 17.2 | 0.085 | 1.3 | 19 | 19 |
| Comp. Ex. 2 | Styrene-based polymer | 164 | 16.2 | 0.099 | 1.3 | 13 | 11 |
| Comp. Ex. 3 | Acrylic polymer | 45.6 | 23.3 | 0.511 | 1.3 | 11 | 9 |

Figure 2:
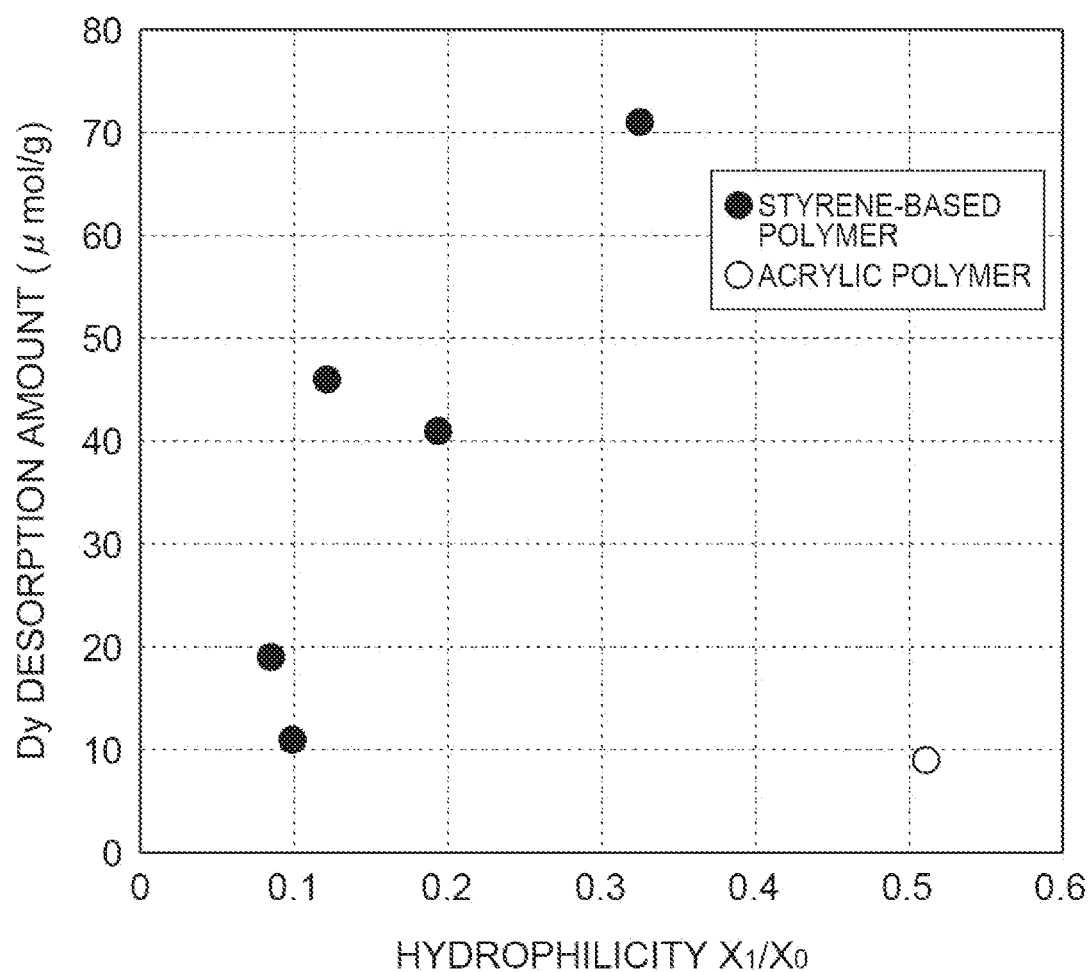
FIG. 2 is a graph showing the relationship between the desorption amount of dysprosium ions in a desorption test and $X_1/X_0$.

Table 1 shows the evaluation results. FIG. 2 is a graph showing the relationship between the desorption amount of dysprosium ions in a desorption test and $X_1/X_0$, which is a hydrophilicity index. From these results, it was verified that when the carrier particles were styrene-based polymer particles, and $X_1/X_0$ was 0.10 to 1.0, the adsorption amount of the rare earth element was large, and the adsorbed rare earth element was desorbed at a high proportion. The hydrophilicity index, $Y_1/Y_0$, of the base material particles constituting the adsorbent particles of Example 3 is 0.093 as described above, and this is slightly smaller than the hydrophilicity index, $X_1/X_0$, of the adsorbent particles. As such, the value of $Y_1/Y_0$ is smaller when compared to $X_1/X_0$ due to the effect of the presence or absence of hydrophilic diglycolic acid residues; however, it is speculated that $Y_1/Y_0$ is also correlated to the adsorption amount and the desorption amount of the rare earth element, similarly to $X_1/X_0$.

REFERENCE SIGNS LIST

10: packed column, 11: column main body part, 12: connection part, 13: column packing material.

The invention claimed is:

1. Adsorbent particles, each comprising:
a carrier particle comprising an organic polymer comprising a monomer unit derived from a styrene-based monomer;
a hydrophilic organic compound adhered to a surface of the carrier particle; and
a diglycolic acid residue bonded to the hydrophilic organic compound,
wherein when a BET specific surface area of the adsorbent particles as determined by adsorption of nitrogen gas is $X_0$ and a BET specific surface area of the adsorbent particles as determined by adsorption of water vapor is $X_1$, $X_1/X_0$ is 0.10 to 1.0.

2. The adsorbent particles according to claim 1, wherein the carrier particle is a porous polymer particle.

3. The adsorbent particles according to claim 1, wherein the hydrophilic organic compound is an amino group-containing polymer comprising a constituent unit having an amino group, and the diglycolic acid residue is bonded to the amino group.

4. The adsorbent particles according to claim 3, wherein a quantity of the amino group in the adsorbent particles is 0.1 to 100 mmol per 1 g of the adsorbent particles.

5. The adsorbent particles according to claim 1, wherein the adsorbent particles are configured to recover a rare earth element.

6. A packed column comprising: a column main body part; and the adsorbent particles according to claim 1 packed in the column main body part.

7. A method for recovering a rare earth element, the method comprising:
bringing a solution containing a rare earth element into contact with the adsorbent particles according to claim 1 and thereby causing the rare earth element to be adsorbed to the adsorbent particles; and
desorbing the rare earth element from the adsorbent particles by contact with an acidic solution containing an acid.

8. The method according to claim 7, wherein an acid concentration of the acidic solution is 0.5 N or lower.

9. Base material particles, each comprising:
a carrier particle comprising an organic polymer comprising a monomer unit derived from a styrene-based monomer; and
a hydrophilic organic compound adhered to a surface of the carrier particle,
wherein when a BET specific surface area of the base material particles as determined by adsorption of nitrogen gas is $Y_0$, and a BET specific surface area of the base material particles as determined by adsorption of water vapor is $Y_1$, $Y_1/Y_0$ is 0.05 to 1.0, and
wherein the base material particles are configured to form adsorbent particles comprising a diglycolic acid residue bonded to the hydrophilic organic compound.

10. The base material particles according to claim 9, wherein the carrier particle is a porous polymer particle.

11. The base material particles according to claim 9, wherein the hydrophilic organic compound is an amino group-containing polymer comprising a constituent unit having an amino group.

12. The base material particles according to claim 11, wherein a quantity of the amino group in the base material particles is 0.1 to 100 mmol per 1 g of the base material particles.

* * * * *